(12) United States Patent
Hobbs

(10) Patent No.: US 11,949,265 B2
(45) Date of Patent: Apr. 2, 2024

(54) MODULAR POWER SUPPLY SYSTEM INCLUDING A BATTERY POWER SUPPLY MODULE

(71) Applicant: OE Electrics Limited, Wakefield (GB)

(72) Inventor: Timothy Richard Hobbs, Wakefield (GB)

(73) Assignee: OE ELECTRICS LIMITED, Yorkshire (GB)

( * ) Notice: Subject to any disclaimer, the term of this patent is extended or adjusted under 35 U.S.C. 154(b) by 393 days.

(21) Appl. No.: 17/275,008

(22) PCT Filed: Apr. 9, 2020

(86) PCT No.: PCT/GB2020/050939
§ 371 (c)(1),
(2) Date: Mar. 10, 2021

(87) PCT Pub. No.: WO2020/208371
PCT Pub. Date: Oct. 15, 2020

(65) Prior Publication Data
US 2022/0069598 A1 Mar. 3, 2022

(30) Foreign Application Priority Data
Apr. 12, 2019 (GB) ..................................... 1905195

(51) Int. Cl.
*H02J 7/00* (2006.01)
*A47B 21/06* (2006.01)
(Continued)

(52) U.S. Cl.
CPC ............ *H02J 7/0044* (2013.01); *A47B 21/06* (2013.01); *H01M 10/425* (2013.01);
(Continued)

(58) Field of Classification Search
CPC .... H02J 7/0044; H02J 7/0024; H01M 50/204; H01M 10/425; H01M 2010/4271; A47B 21/06; A47B 2021/066
(Continued)

(56) References Cited

U.S. PATENT DOCUMENTS 4,224,769 A * 9/1980 Ball ....................... A47B 21/06
312/140.1
4,838,175 A * 6/1989 Hauville .................... B01L 9/02
108/50.02
(Continued)

FOREIGN PATENT DOCUMENTS

GB  2 536 450  9/2016

OTHER PUBLICATIONS

International Preliminary Report on Patentability and Written Opinion for related PCT/GB2020/050939 dated Sep. 28, 2021.

*Primary Examiner* — Jose V Chen
(74) *Attorney, Agent, or Firm* — Woodard, Emhardt, Henry, Reeves & Wagner, LLP

(57) ABSTRACT

A system for providing AC or DC power, for charging or powering electrical/electronic devices that are being used whilst the device is located at, around or within, an item of furniture which is defined as an item that has no local connection point to a mains AC wired power supply of an environment. The system is provided by a series of modules, at least some of which are based around a single mechanical fixation system, thereby allowing the furniture designer or manufacturer to implement a common mechanical fixing system and choose from a variety of modules to create the electrical system so desired. Modules within the system include a at least one battery module plus modules such as a Power Supply Unit (PSU), an AC or DC power in-feed connection point, DC power provision points, inverter, AC (Continued)

Figure 1A:
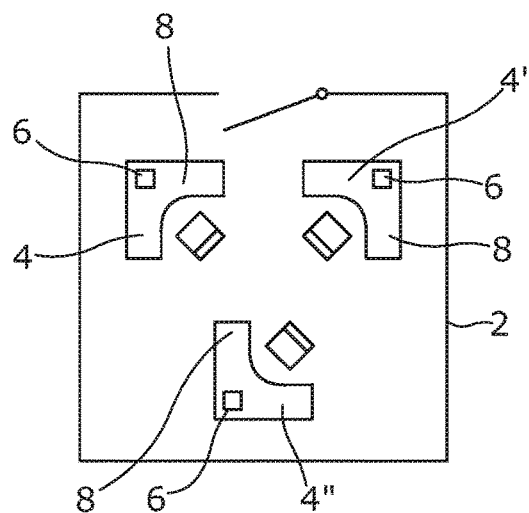

power provision points, switches, electrical protection devices and/or power control devices.

31 Claims, 15 Drawing Sheets

(51) Int. Cl.
　　*H01M 10/42* 　　(2006.01)
　　*H01M 50/204* 　　(2021.01)
(52) U.S. Cl.
　　CPC ......... *H01M 50/204* (2021.01); *H02J 7/0024* (2013.01); *A47B 2021/066* (2013.01); *H01M 2010/4271* (2013.01)
(58) Field of Classification Search
　　USPC .............. 108/50.02; 312/223.1, 223.6, 223.3
　　See application file for complete search history.

(56) References Cited

U.S. PATENT DOCUMENTS

| | | | | |
|---|---|---|---|---|
| 5,237,935 A | * | 8/1993 | Newhouse | A47B 83/001 108/50.02 |
| 5,277,609 A | * | 1/1994 | Ondrejka | H02G 3/00 439/211 |
| 5,606,919 A | * | 3/1997 | Fox | E04B 2/7433 108/50.02 |
| 6,152,048 A | * | 11/2000 | Vander Park | A47B 17/003 312/196 |
| 6,327,983 B1 | * | 12/2001 | Cronk | A47B 21/06 108/50.02 |
| 6,493,217 B1 | | 12/2002 | Jenkins | |
| 8,174,379 B2 | * | 5/2012 | Black | H01R 25/00 340/568.4 |
| 8,925,469 B2 | * | 1/2015 | Bennie | A47B 21/06 108/50.02 |
| 9,681,747 B1 | * | 6/2017 | Pectol | A47B 13/083 |
| 10,827,829 B1 | * | 11/2020 | Labrosse | A47B 21/06 |
| 11,283,131 B1 | * | 3/2022 | Carroll | H02J 7/0013 |
| 2007/0251428 A1 | * | 11/2007 | Mead | E04B 2/7422 108/50.02 |
| 2014/0368476 A1 | * | 12/2014 | Rauch | H02J 1/00 345/204 |
| 2016/0022030 A1 | * | 1/2016 | Scott | H01R 13/60 439/31 |
| 2018/0006470 A1 | | 1/2018 | Stacey et al. | |
| 2020/0313451 A1 | * | 10/2020 | An | H02J 7/00 |

* cited by examiner

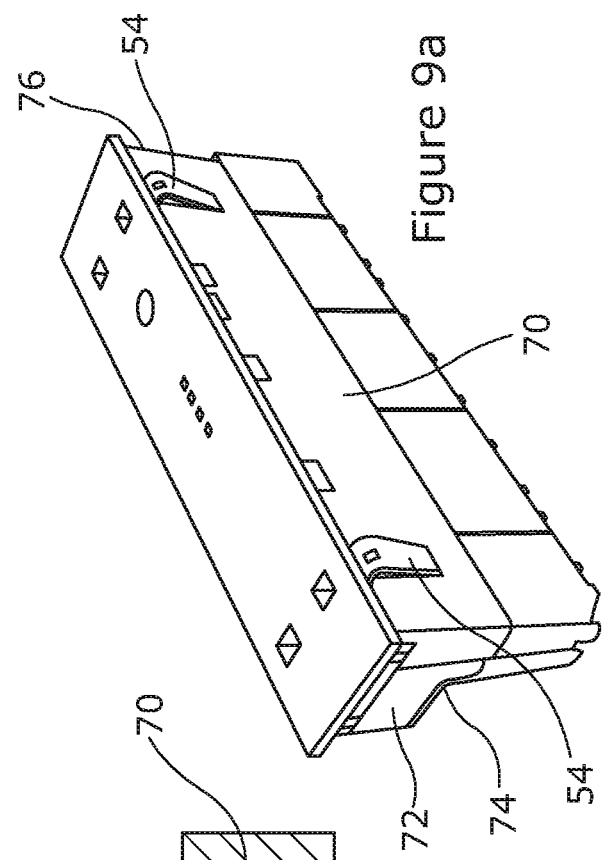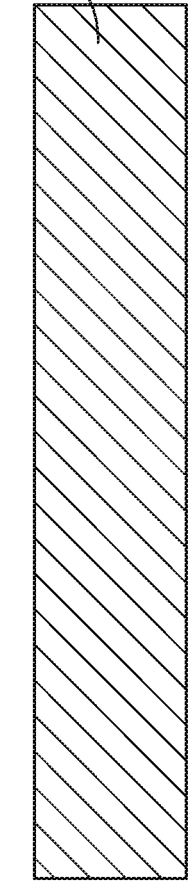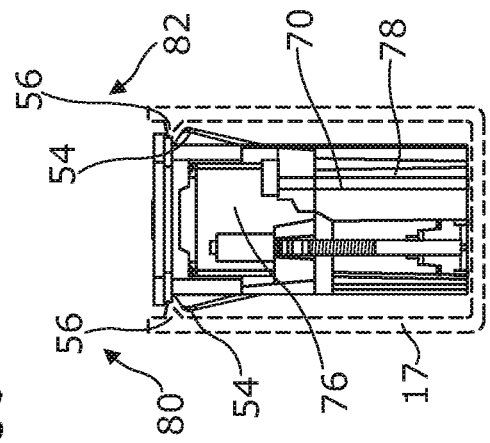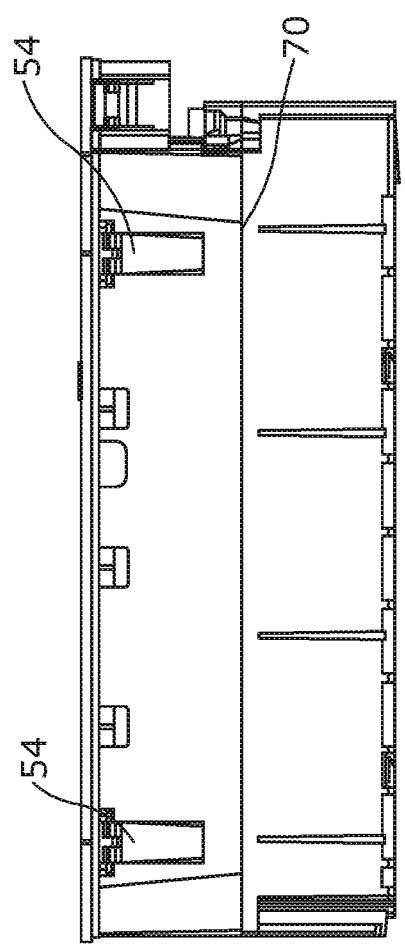

MODULAR POWER SUPPLY SYSTEM INCLUDING A BATTERY POWER SUPPLY MODULE

The invention to which this application relates is a system for providing AC or DC power, for charging or powering electrical/electronic devices that are being used whilst the person is located at, around or within, an item of furniture which can be defined as an item which is mobile and/or that has no local connection point to the mains AC wired power supply of an environment in which the item of furniture is to be used. The system is provided in a series of modules, and all, or at least a number, of the said modules are based around a single mechanical fixation system, thereby allowing the furniture designer or manufacturer to implement a single mechanical fixing system and choose from a variety of modules to create the electrical system so desired for their application. Modules within the system include at least one battery module plus modules such as a Power Supply Unit (PSU), an AC or DC power in-feed connection point, DC power provision points, inverter, AC power provision points, switches, electrical protection devices and/or power control devices.

The provision of conventional mains AC power sockets at selected locations in the floor or wall of a building is well-known and conventionally, considerable thought and planning is required to be undertaken in order to attempt to provide the mains power sockets at the most convenient locations for the subsequent use of the building or room as, once the locations of the mains power sockets are selected and the same are installed, the locations are permanently fixed as the mains power sockets are effectively provided as part of the fabric of the building. As a result of this, the configuration of the room and/or locations of use of the items of furniture provided in the room are, to a large extent, dictated by the location of the mains power sockets.

Conventionally, the mains AC power sockets are directly connected to the building mains power supply via a cable and/or floor track system typically hidden behind the wall or under the floor and the mains power sockets are either provided in fixed locations on the wall or in floor boxes. In addition in, usually older, buildings power sockets cannot easily be located or relocated in floors due to the floors being solid rather than of a suspended construction.

While these forms of system are well-known and have been used for many years, the demand for increased flexibility in the use of a room has increased, typically due to one or more of the facts that; floorspace is increasingly expensive, especially in buildings in city locations, and/or there is a greater range of potential uses of the floorspace and/or the type of furniture being used in commercial spaces with users requiring access to power is diversifying and/or there are a greater number of devices which are required to be supplied with a power source. Any, or any combination, of these reasons means that the conventional, fixed location of the mains power supply sockets, is increasingly regarded as an inconvenience and a restriction upon the ability to use floor space and rooms in general, for a number of a selected range of uses.

Typically, to reconfigure a room so that the same room can be used for a number of different uses at different times, and/or to allow a number of users to use the same area at different times, requires items of furniture to be selectively provided and/or located in and/or removed from the room, and, furthermore, the need to change the configuration is found to be more frequent than has previously been required.

Furthermore, there is also an increase in the different types of power points which can be required to be provided for use and it is believed that, going forward, the requirement for different types of power points, such as USB charging sockets and/or other charging types, such as wireless charging facilities, to be made available for use, will increase further. This means that it is difficult for the installer, at the time of installation to be able to judge the particular form and/or combination of power provision points which they should install and/or end user requirements may mean that a number of different configuration options are required to be provided. It would of course be possible to provide a bespoke power provision system but this requires a significant number of components to be provided and to then be electrically wired and connected in order to provide the required configuration and this is time consuming and expensive to achieve. There is a clear need to provide a solution which provides flexibility in the provision of power to a number of power point provision points and to allow the required configuration to be achieved in a relatively easily repeatable manner, and so provide at least a base unit which can be installed into the item in which the same is to be used and thereby allow the maximum utilisation and adaptability of floorspace and rooms and items of furniture provided therein.

Furthermore, due primarily to the adoption of informal and flexible workspaces, there is an increasing variety of furniture being used in commercial environments in which the users of the premises require access to some form of power provision, and due to the design and or moveable nature of such furniture, conventional connection by cable of such furniture to the mains AC supply may not be desirable for a wide range of reasons. This and the increasing requirement for easily accessible charging points to be made available for mobile devices in areas that historically have had not had AC power sockets available to users of the area, such as an exhibition hall, retasked older building, café, reception, transport hubs, public waiting areas or hospitality tents where the provision of AC power within such areas may have both infrastructure and safety issues, means that often the provision of power points in these areas is non-existent or not sufficient.

Although the provision of power for charging of portable electrical devices in such areas can already be achieved through the use of portable battery banks, these are not ideal in public locations, such as shopping malls, transport hubs, exhibition halls, restaurants and outdoor hospitality events. What is required is for proprietors of open plan areas or public spaces to be able to include a plurality of power provision points within items of furniture and thereby allow control of the safe provision of power and prevent theft of otherwise portable battery banks. In places where the furniture is mobile or the furniture is located away from a mains AC power source, this also requires the furniture to have an installed power storage capability, as well as the plurality of installed power provision points to allow users to connect and thereby charge or power their devices. Furthermore, the power storage facility needs to have the necessary components to allow the proprietor to recharge it.

As a result of the demand for power provision in these flexible or public spaces, solutions for this problem do abound but they are the result of furniture manufacturers bringing together a disparate set of electrical components from various specialist suppliers that, together, will perform the overall desired function, sometimes requiring bespoke connections and/or the use of qualified electricians to ensure the electrical connections are safe. Being from various sources, the furniture manufacturer has to accommodate the components with various fixing methods for the battery, power supply unit, in-feed components, power provision points and any other features they wish to integrate, which means that from one application to the next they cannot standardise their furniture and provide a cost effective solution.

An aim of the present invention is to provide a modular system from which a suitably configured electrical solution can be formed of the required configuration and the system can then be integrated into an item of furniture around a single fixation mechanism, and thereby allow power to be provided to one or more user accessible power provision points located in the item of furniture or connected thereto without the need for a permanent connection to a building power supply, whether AC or DC. Notwithstanding the single fixation modularity of the system, a further aim would be to allow the user to use any of the modular parts of the system with additional non-modular parts in situations where they wish to differentiate their furniture, their design aesthetic or place the power provision points remote from the other modules, which they may prefer to hide in the furniture.

In a first aspect of the invention, there is provided a modular power supply apparatus, said apparatus including at least one battery module with one or more power cells provided therein, at least one power provision point module electrically connected to receive power from said battery module, a power supply unit module to allow the change of power from AC to DC power, and/or a power infeed module, and a mounting means, wherein said modules are electrically connected and at least two of said modules include mechanical location means of substantially the same form so as to allow said modules to be similarly mechanically located with said mounting means and said mounting means locatable with an item of furniture for use therewith.

In one embodiment at least the power supply unit and battery modules have substantially similar mechanical connection means.

In one embodiment at least the battery module and power provision point module have substantially similar mechanical connection means In one embodiment at least those modules which are to be located with the mounting means are electrically connected via respective plug and socket connectors typically formed as part of the module.

Typically the modules which can be used in the mounting means include at least one battery module, and any or any appropriate combination of power supply unit module, AC or DC power infeed module, one or more further battery modules, one or more AC or DC power provision point modules, inverter module and/or power control or protection modules.

The power supply unit typically is a converter apparatus which allows an incoming AC power supply to be converted to a DC power supply which can then be provided to the battery module to charge the same. Thus, in another embodiment, if the incoming power supply to the apparatus is a DC power supply rather than an AC power supply, the power supply unit module will not be required to be fitted as the DC power supply can be directly connected to the battery module to charge the power cells located therein.

Typically the battery module includes a body with at least one, but typically a plurality of rechargeable power cells located therein and, in one embodiment the appropriate components and control circuitry which allow the charging of the power cells to be performed in a safe and controlled manner so as to prevent damage to the power cells and any risk of overheating or fire.

In one embodiment each battery module has an input DC electrical connection in the form of a plug or socket and one or more output DC electrical connections in the form of the other of a plug or socket.

In one embodiment the mechanical location means formed on the body of the battery module allow engagement with the mounting means and alignment of the module with other modules to enable the adjacent modules to be mechanically and electrically linked together.

In one embodiment a plurality of battery modules are electrically connected and mechanically located in-line in said mounting means.

In one embodiment, the power supply unit module changes the AC power supply which it receives to a DC power supply which it outputs.

In one embodiment, further modules can be provided in electrical connection with one or more modules located in the mounting means but are not mechanically located therewith so that these modules are connected via electrical cables.

In one embodiment, the battery module can be disconnected from the mounting means and other modules to allow the rechargeable power cells therein to be recharged by connection of the battery module with a charging facility located remotely from the mounting means. In this embodiment, in order to provide a charge, the one or more battery modules are disconnected and removed and placed at and connected to the charging facility which, in one embodiment may be a charging bank for a number of battery modules so as to allow, for example, all of the battery modules to be charged overnight and then be available the next day for selection by a user who may carry the same and mechanically connect the same to the mounting means and plug the same into electrical connection with other modules in the mounting means such as an item of furniture at which they wish to use the power provision points. It is envisaged that the battery module may include a carrying handle on the body to allow the safe movement and fitting of the same.

In one embodiment, in addition, or alternatively to the removal of the battery modules for charging, the apparatus includes one or more modules to allow the battery module or modules to be charged, in situ, whilst in mechanical location with the mounting means. In one embodiment the charging is achieved via an AC power infeed module electrically connected to the power supply unit module which are both mechanically connected in the same mounting means as the battery module to be charged and are provided to transform a mains AC power supply to a DC power supply and allow charging of the one or more power cells of the one or more battery modules. Alternatively the charging could be achieved via a DC power supply cable connecting directly/indirectly to the battery module, without the need for an installed power supply unit module In one embodiment, the AC mains power supply is provided to the apparatus via a detachable cable and plug connection to the AC power in-feed module using an integrated IEC C series or similar power inlet connector and which can be selectively connected to the power supply unit module to allow a charging facility to be provided to the one or more cells of the at least one battery module. Typically the cable and plug can be removed at other times and the power supply to the one or more power provision point modules, and any devices connected therewith, is provided from the power cells of the one or more battery modules. In one embodiment the cable from the mains power supply is extended from an AC power socket to the location of the power supply apparatus to be connected thereto.

In one embodiment, the apparatus includes a plurality of power provision point modules which can be selectively connected to the one or more battery modules and/or power supply unit module and/or power in-feed module, depending upon the particular requirement for AC or DC configuration of power which is to be supplied therefrom.

In one embodiment some of the modules may be interconnected by cables such as to allow, for example, one or more of the power provision point modules to be located at a distance from the location of the mounting means so as, for example, to allow the power provision point to be provided at locations which are most convenient for a user on an item of furniture or in the vicinity thereof and for the mounting means and the modules located therewith to be located on the same item of furniture at a location which is most convenient for the storage of the same.

In one embodiment the mounting means is provided in the form of a housing and the housing, with the modules mechanically located therewith is located at the required location in another item, such as an item of furniture.

In one embodiment the mounting means is provided as an elongate housing with a longitudinal axis and said modules are mechanically connected to the mounting means so that they are positioned in line along said axis.

In one embodiment the mechanical connection of the modules with the mounting means is achieved by a flexible clip system, that allows for installation of the modules without the need for standard fitting tools such as screwdrivers, spanners, grips or the like to be used and also preferably with sufficient safety using plug and socket connections such that the electrical connection and disconnection of a module from other modules in the mounting means can be performed without the need for qualified electrician to perform the same.

In one embodiment the said modules are selectively removable from the mounting means in a direction which is perpendicular to the longitudinal axis of the mounting means and via the use of a tool to release locking means which lock the modules in position with the mounting means.

In another embodiment the said modules are selectively removable from the mounting means in a direction which is parallel to the longitudinal axis of the mounting means In one embodiment the mounting means are provided as an extruded member with mechanical location means formed therealong and the length of the member can be selected to define a capacity the location of a plurality of modules therealong such as, for example, a plurality of battery modules which, when located therein are mechanically located with the mounting means and/or each other so as to allow the electrical connection of the same in a configuration which defines the electrical power capacity and/or length of time of provision of power from said apparatus.

In another embodiment the mounting means can include a cap or enclosing means, which may be lockable in position in order to enclose the modules, therein whilst still allowing access to the power provision points modules for use of the same to provide power for user devices.

In one embodiment, a selected number of said power provision point modules and/or battery modules are provided in a particular configuration in order to allow a selected number of power provision points to be available and/or types of power provision point types (such as different types of sockets, wireless charging) to be made available for a specific use.

Also, a number of the power supply unit modules and/or battery modules can be selectively connected together in order to provide a greater power supply capacity, when charged, in order to provide the apparatus in a configuration suited for the particular use and which can be provided and used independently and remotely from the mains power supply to the area and/or item of furniture in which the apparatus in accordance with the invention is provided.

In one embodiment the power supply unit module can be connected directly to one or more DC power provision point modules to allow operation of the modular system from a permanent mains AC supply if in certain situation this is available.

In one embodiment an inverter module can be provided in order to allow conversion of the DC power from the battery module to an AC power supply so as to provide a power provision point in the form of a standard mains AC socket.

In one embodiment, the modules are located with respect to a common mounting means in the form of track with which the said modules of the apparatus can be selectively positioned and the particular selection and connection of the modules in the mounting means define the particular configuration of the apparatus.

In one embodiment there is provided at least one power provision point module which has mechanical location means which allow the same to be mechanically attached to another module which is in turn mechanically located with the mounting means. In one embodiment the said module is a battery module and the said at least one power provision point module has at least one DC USB socket provided thereon. This allows both parts to be installed and removed from the mounting means as one unit so that for example, after being removed from the common mounting means, the USB charging module can be disconnected from a discharged battery module and then attached to a fully charged battery module or alternatively if faulty, replaced by a new USB charging module. In all cases no electrical connections/disconnections needing to be made other than by simply plugging or unplugging male and female connectors.

In one embodiment the mounting means and respective modules located therewith are provided such that the same can be provided in the required configuration at the time of assembly and subsequently removed and replaced and/or the configuration altered in a "plug and play" manner and without the need for qualified electricians to perform the actions.

Typically therefore the said modules which are provided to be mechanically located in the said mounting means have integrated mechanical location means formed therein which, in one embodiment, include locking means, in order to allow their location in the said mounting means without additional fixing means such as screws being required to be used.

In one embodiment the said integrated locking means for each module can be released to allow the module to be removed by use of a suitable tool so as to prevent unauthorised removal and/or theft of the modules when at a location of use.

In one embodiment the mounting means is provided in the form of a portable housing to allow a combination of modules such as a battery module plus attached USB charging module which are mechanically located with the mounting means to be moved with the mounting means and placed, for example, on a desk or table as and when power is required and then easily returned for storage and/or charging of the battery module.

In one embodiment certain modules are located within the mounting means whilst other modules, such as power provision point modules, may be connected by a cable connection and located on the item of furniture at a location which is remote from the mounting means in order to allow the same to be located at the most convenient location for use.

In any of the embodiments, the selection of the modules and electrical connection of the same, and mechanical connection of those modules as required to the mounting means can be performed at the time of assembly and then supplied as a unit to be installed in the item that they are to be provided as part of, and, in one embodiment, with the mounting means provided as an integral part of the item and the modules selectively removable therefrom to allow reconfiguration, maintenance and/or charging of the battery modules and thereby allow the adaptation of the apparatus over time and which may also include the addition or removal of selected modules.

It is envisaged that the apparatus as herein described is of particular use when installed in an item of furniture which can have other functional purposes such as a desk, chair, or a power hub apparatus and the ability for power to be supplied from the apparatus without the need for a continuous connection to a mains power supply, thereby ensures that power is available at the item of furniture and enables the item of furniture to be selectively positioned and the particular location of the same can be altered to suit the particular use requirement for the facility at different times, whilst maintaining the ability for a power supply to be available from the item of furniture.

It will therefore be appreciated that the current invention allows the provision of an agile power supply apparatus which is released from the constraints of fixed position AC power sockets "freeing up" of the location of the power supply connections and therefore makes the same available at the required location of use at that time rather than, as would conventionally be the case, the location of the power supply sockets in the room being the determining factor as to where the item of furniture or hub needs to be located.

In a further aspect of the invention, there is provided an item of furniture, said item of furniture including at least one power provision point module for the provision of power for selective use by a device, wherein the said power provision point module is electrically connected to a battery module from which said power is provided and said battery module is located in a mounting means in which the said power provision point module is also mechanically connected using substantially similar mechanical location means to those of the battery modules and said modules are electrically connected when mechanically located in said mounting means which in turn is mechanically located in the said item of furniture so as to form a power supply source for the item of furniture.

Typically the battery module includes a number of power cells which are rechargeable when the battery module is connected to a power source. Typically the power source is an AC power supply and one of the said modules included in the mounting means is a power supply unit module which converts the AC power supply to a DC power supply suitable for charging the battery module. In one embodiment, the said power cells of the battery module is charged in situ by providing a power in-feed module for connection to a mains AC power supply.

In a further aspect of the invention there is provided a kit of parts for the provision of a power supply apparatus, said kit including a mounting means with mechanical location means formed therein, a plurality of modules, each having substantially similar mechanical location means, to allow selective location of the said modules within the mounting means so as to provide the apparatus in a predetermined configuration for use within an item of furniture, to provide one or more power provision points thereon and wherein said modules include; at least one battery module with power cells which are rechargeable and from which DC power is supplied, one or more power provision point modules which allow power to be provided from the same to operate/charge a device and at least one power supply unit module which allows the conversion of an AC power supply to a DC power supply to charge the said battery module and when said modules are selected and mechanically located with the mounting means electrical connection of said selected modules is achieved via engagement of respective plugs and sockets provided on said modules.

In a yet further aspect of the invention there is provided a system for providing AC or DC power for charging or powering electrical/electronic devices that are being used whilst the person is located at, around or within, mobile furniture or furniture that has no local connection point to the mains AC wiring, said system including a series of modules having a common mechanical fixation system, allowing the furniture to include said common mechanical fixation system and choose from a variety of modules to create the electrical system of a desired configuration said modules including at least one battery module and any or any combination of a Power Supply Unit (PSU) module, an AC or DC power in-feed connection point, DC or AC power provision point modules, inverter module, switch modules, electrical protection device modules and/or power control device modules.

In a further aspect of the invention there is provided an item of furniture including a modular power supply apparatus, said apparatus including a mounting means which is located with said item of furniture and wherein said mounting means includes a battery module mechanically located therewith so as to provide power to one or more power provision point modules mechanically located with the said mounting means or separately on the item of furniture, said one or more power provision point modules available for selective use to provide power at the item of furniture without the item of furniture being tethered to a cable connection to a mains power supply.

Figure 1B:
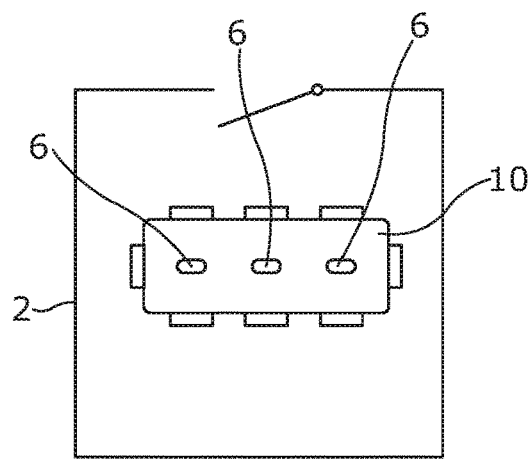
Figure 1C:
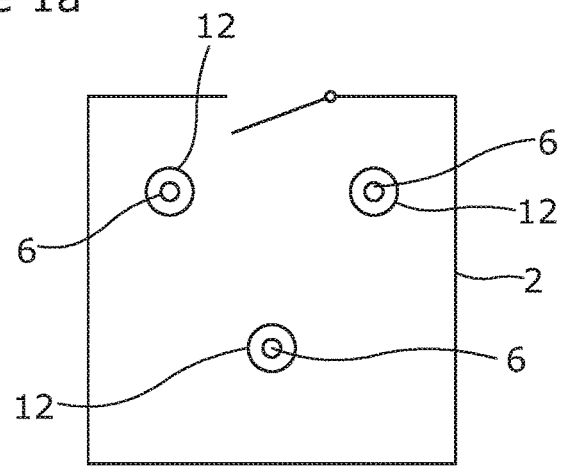
Figure 4A:
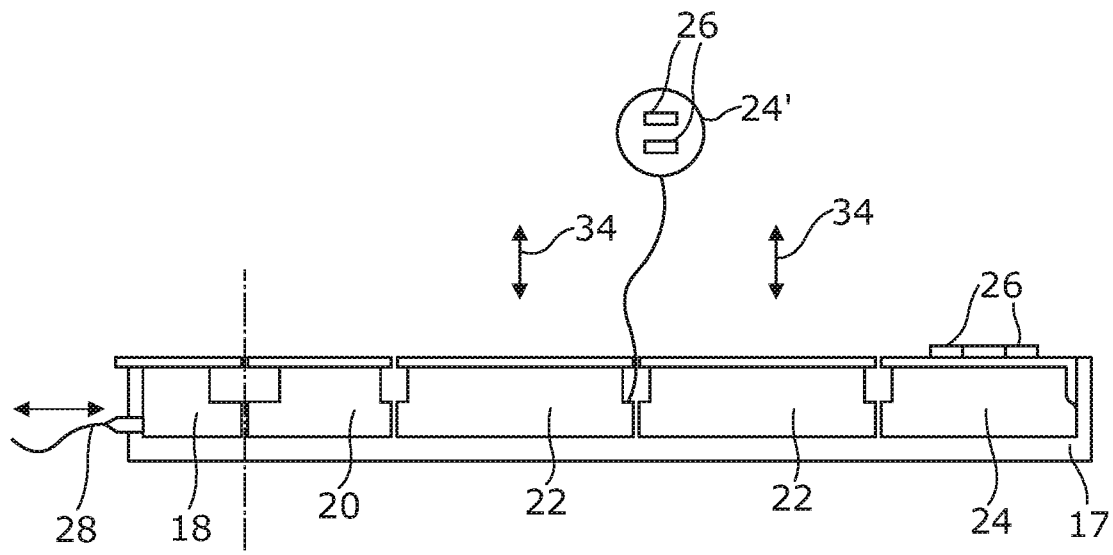
Figure 4B:
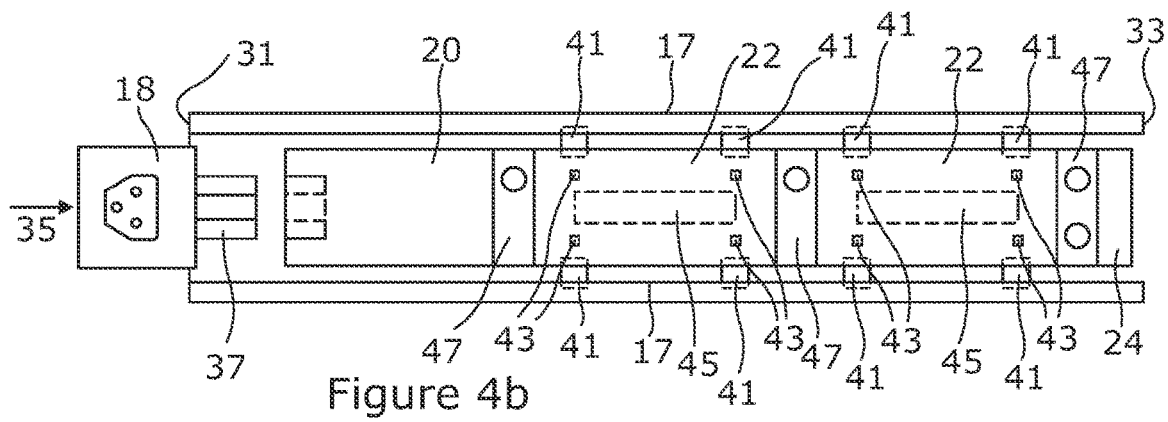
Figure 6B:
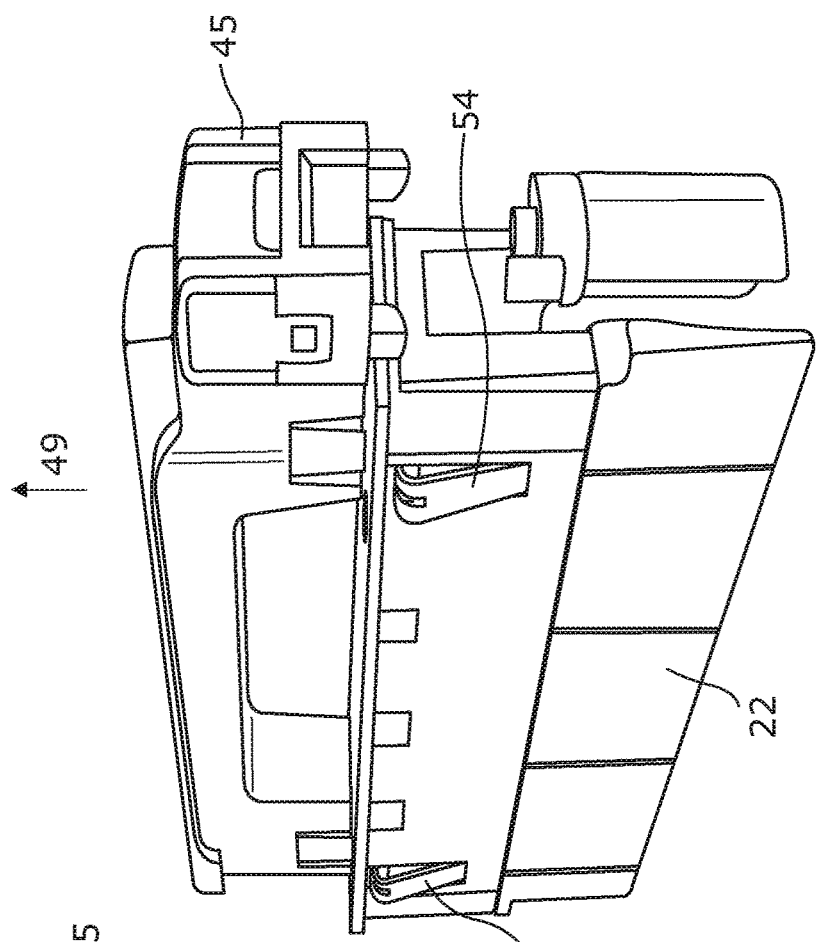
Figure 6A:
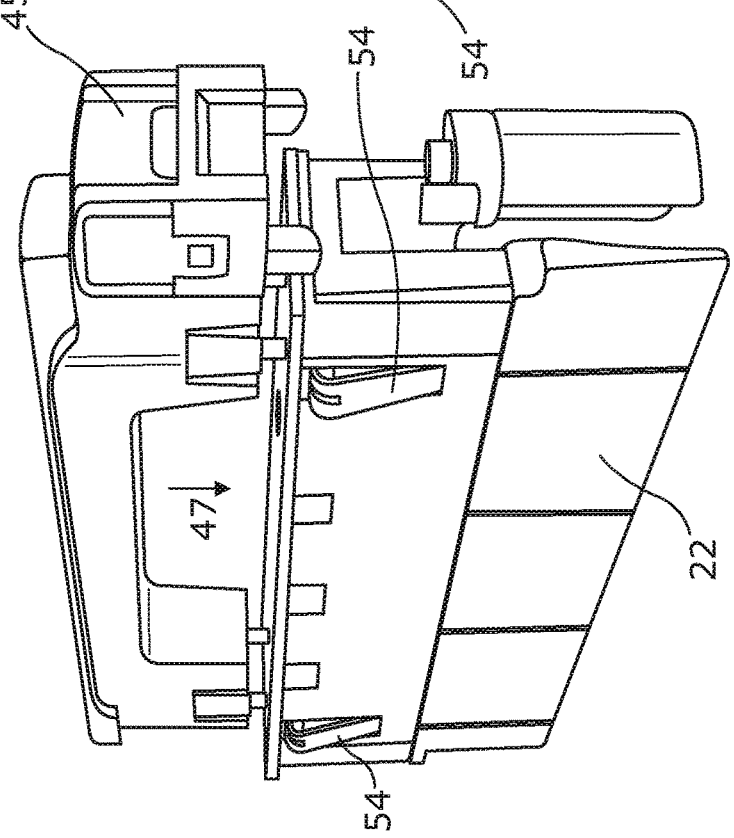
Figure 7:
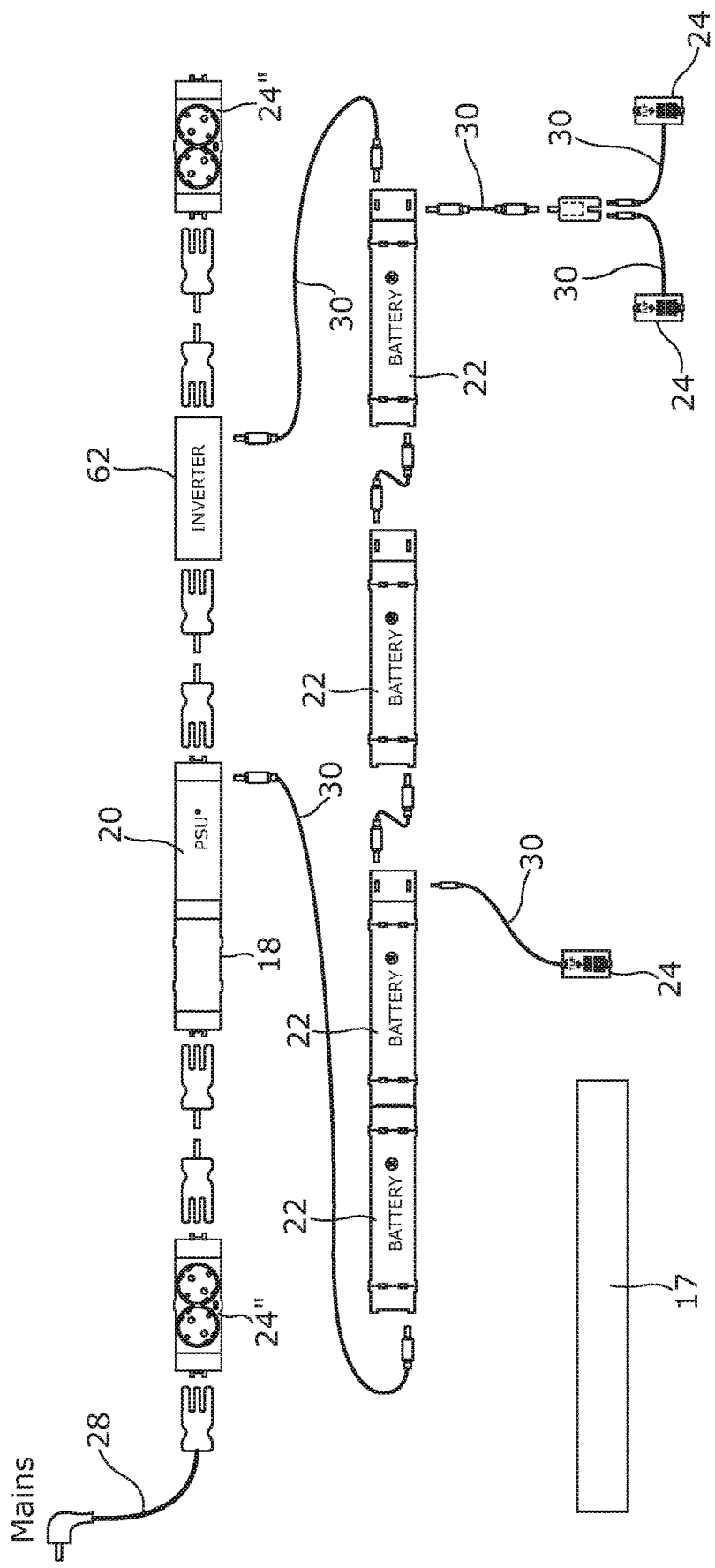
Figure 8A:
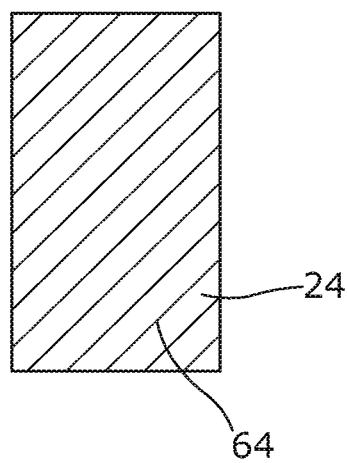
Figure 8C:
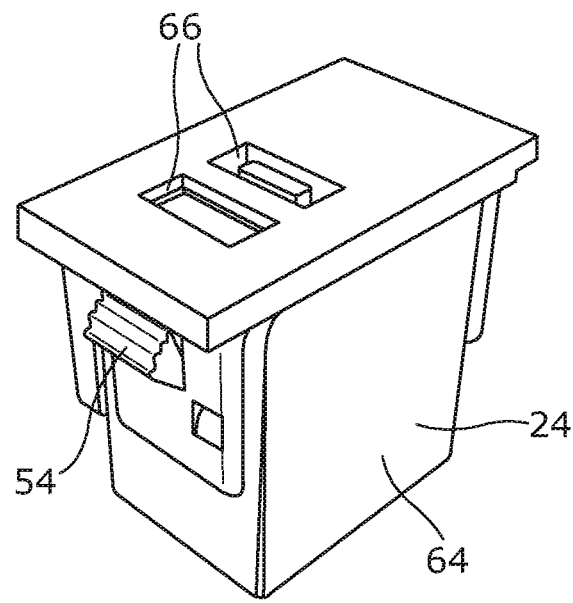
Figure 8B:
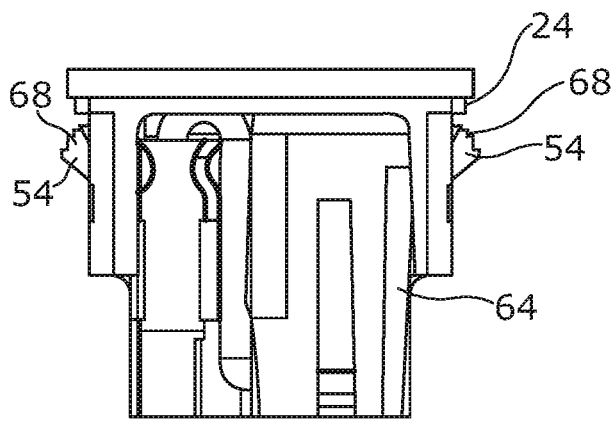
Figure 8D:
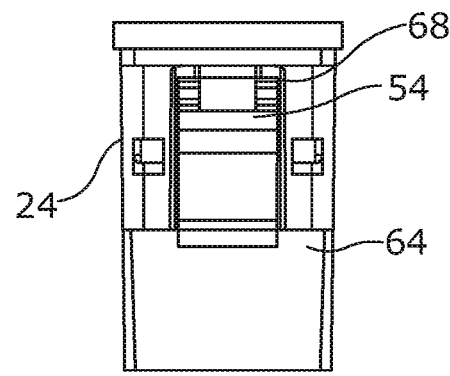

Specific embodiments of the invention are now described with reference to the accompanying drawings wherein:

FIGS. 1a-c illustrate potential configurations of use of the same room of a building in accordance with the invention;

FIGS. 2a-d illustrate embodiments of items with apparatus in accordance with the invention located therein;

FIGS. 3a-k illustrate embodiments of the apparatus with the modules located in a mounting means;

FIGS. 4a-b illustrate embodiments of configurations of the apparatus in accordance with the invention;

FIGS. 5a-e illustrate further embodiments of configurations of the apparatus with a battery module connected to a USB charging module and the battery is intended to be charged at a separate location to that of use;

FIGS. 6a and b illustrate a battery module and removal tool therefore in accordance with the invention;

FIG. 7 illustrates a kit of modules in accordance with one embodiment of the invention;

FIGS. 8a-d illustrate a power provision point module 24 in accordance with one embodiment of the invention; and FIGS. 9a-d illustrate the battery module in accordance with one embodiment of the invention;

Referring firstly to FIGS. 1a-c there are illustrated three plan views of the same room of a building but in use for different purposes. In FIG. 1a the room 2 is in use to have a number of work spaces 4, 4', 4", each of which is provided with a power system 6 in accordance with the invention so that the user at each work space has a power facility provided therewith and, in this embodiment the power charging apparatus in accordance with the invention is provided as part of a desk 8 provided at each work space.

In FIG. 1b the same room is now in use for a conference facility in which there is provided one large table 10 and a series of power apparatus systems 6 in accordance with the invention are provided along the length of the table to allow the selective use of the same.

In FIG. 1c the same room 2 is now in use as a free space area with the tables and desks and chairs removed and power apparatus systems 6 in accordance with the invention are made available by providing a series of free standing power hubs 12 at spaced locations around the floor space.

In each case the power apparatus system includes a mounting means which is mechanically connected to the item of furniture in a required location. The modules which are provided with the mounting means allow the particular configuration of the power supply apparatus system 6 to be defined for the particular item.

Thus, it will be appreciated that while the mounting means and the mechanical location formations on the same remains the same for each apparatus 6, the particular configuration of the power systems 6 can be provided to suit particular uses and this therefore provides an agile and easily configurable apparatus which can be assembled, installed and subsequently reconfigured without the need for an electrician.

Figure 2A:
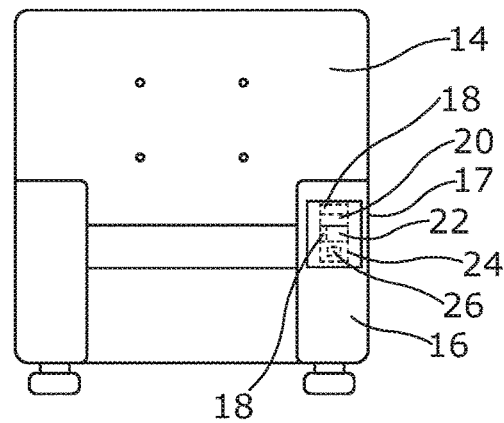
Figure 2B:
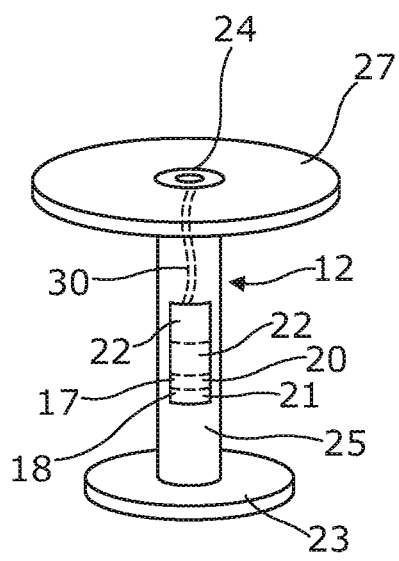
Figure 2C:
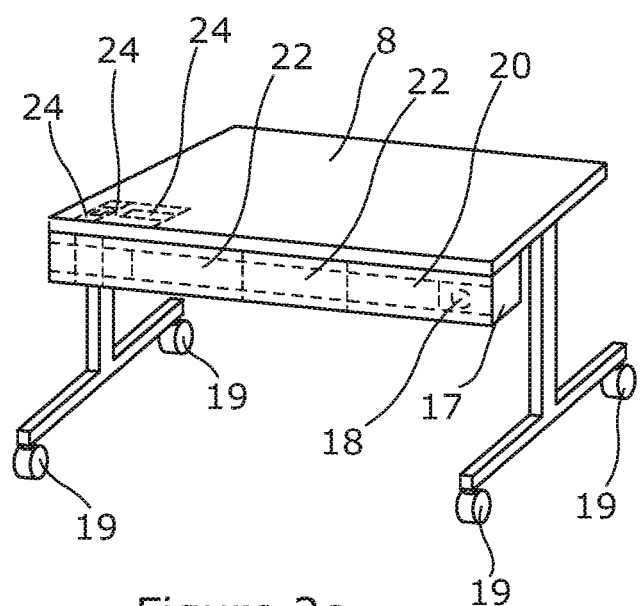
Figure 2D:
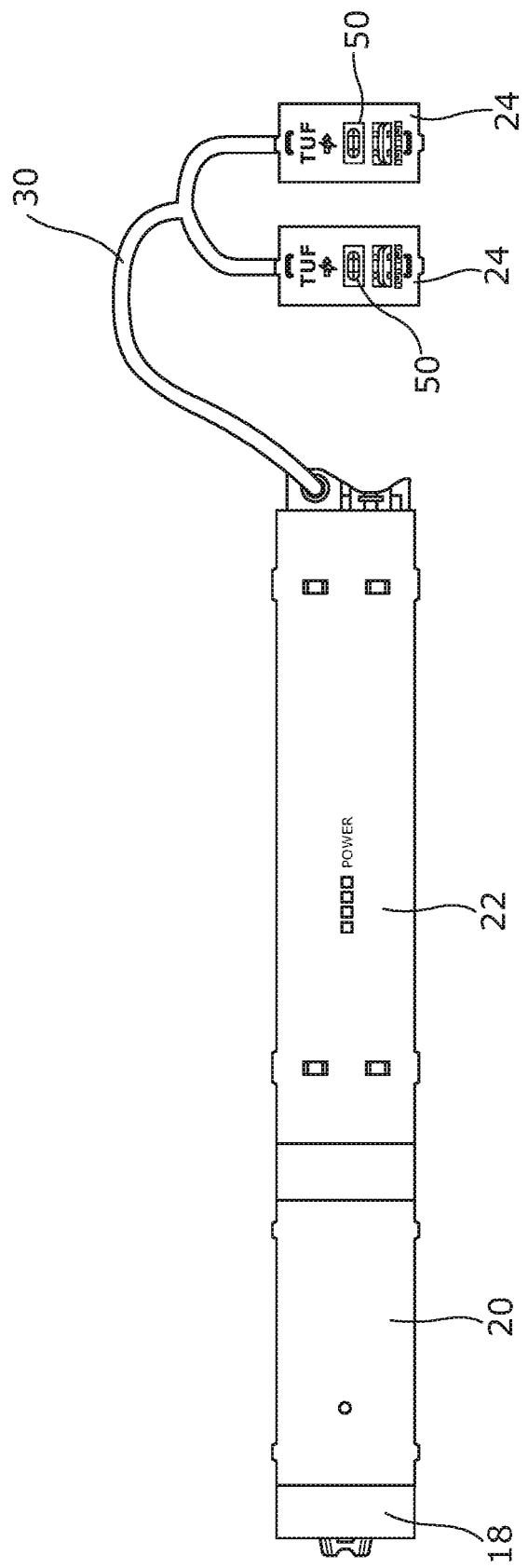
Figure 3A:
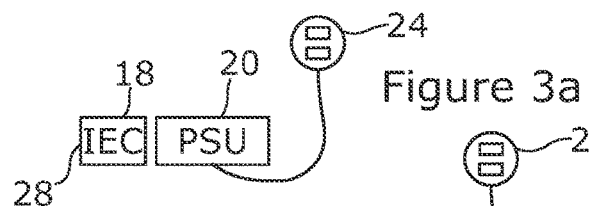
Figure 3B:
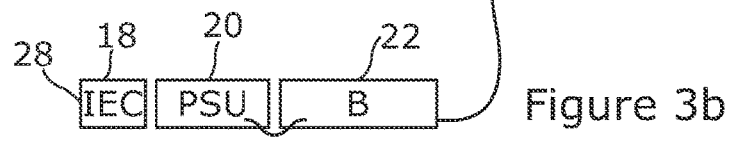
Figure 3C:
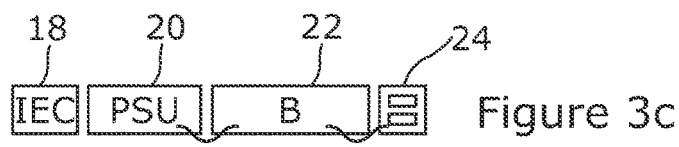
Figure 3D:
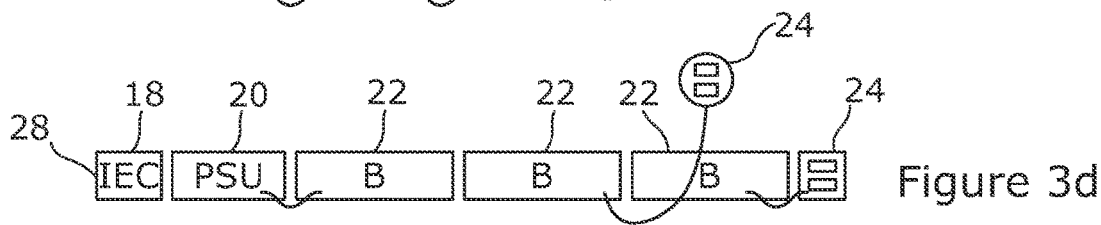
Figure 3E:
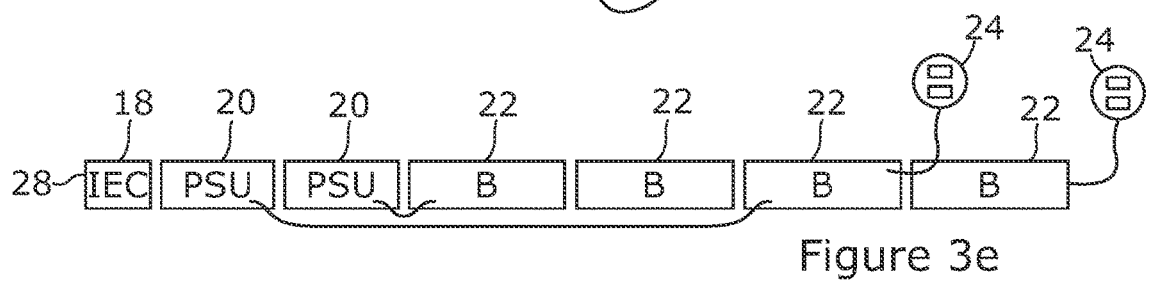
Figure 3F:
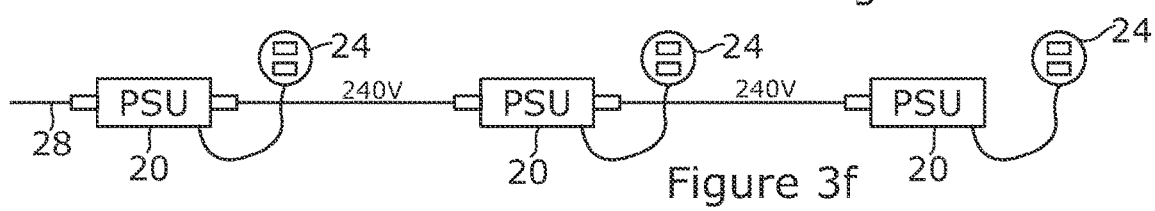

FIG. 2a illustrates one form of the apparatus installed in an arm 16 of a chair 14 and FIG. 2b illustrates the apparatus in accordance with another configuration provided as part of an item of furniture in the form of a power hub 12. FIG. 2c illustrates the apparatus as part of a desk 8 which can be moved to a required position for use via castor wheels 19. In each embodiment there is provided a mounting means 17 which, if required, can include a security closure or door 21 to prevent the unauthorised removal of the apparatus modules located therein or alternatively the modules include locking means which prevent the removal of the module from the mounting means without use of a specially designed tool. An example of this is shown in FIGS. 6a and b in which there is shown a battery module 22 and a removal tool 45 which can be moved from the position shown in FIG. 6a towards the battery module 22 as indicated by arrow 47 to engage with locking means in the form of clips 41 such as shown in FIG. 4b and allow the same to be moved to a release position and allow the battery module to be moved in connection with the tool 45 from the mounting means in the direction of arrow 49.

Figure 3G:
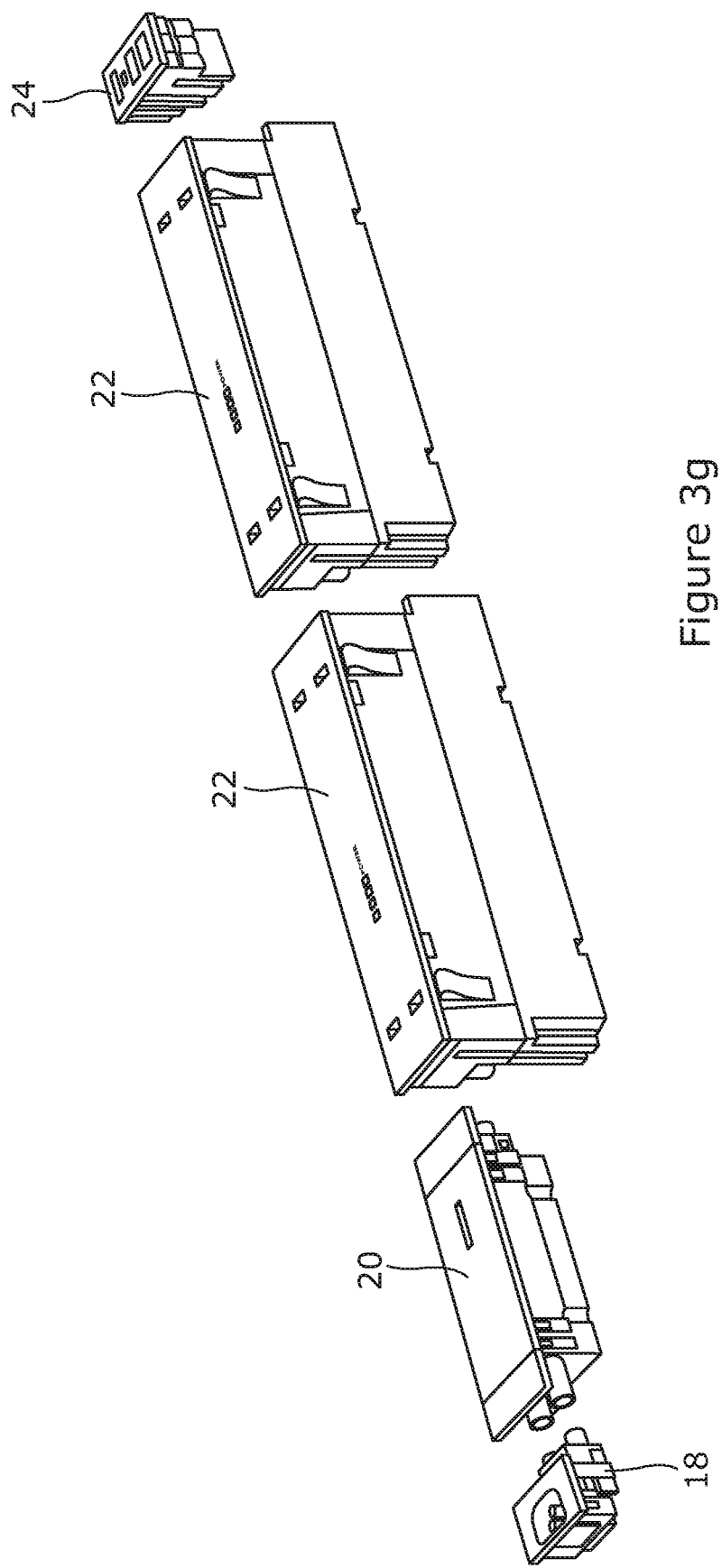
Figure 3H:
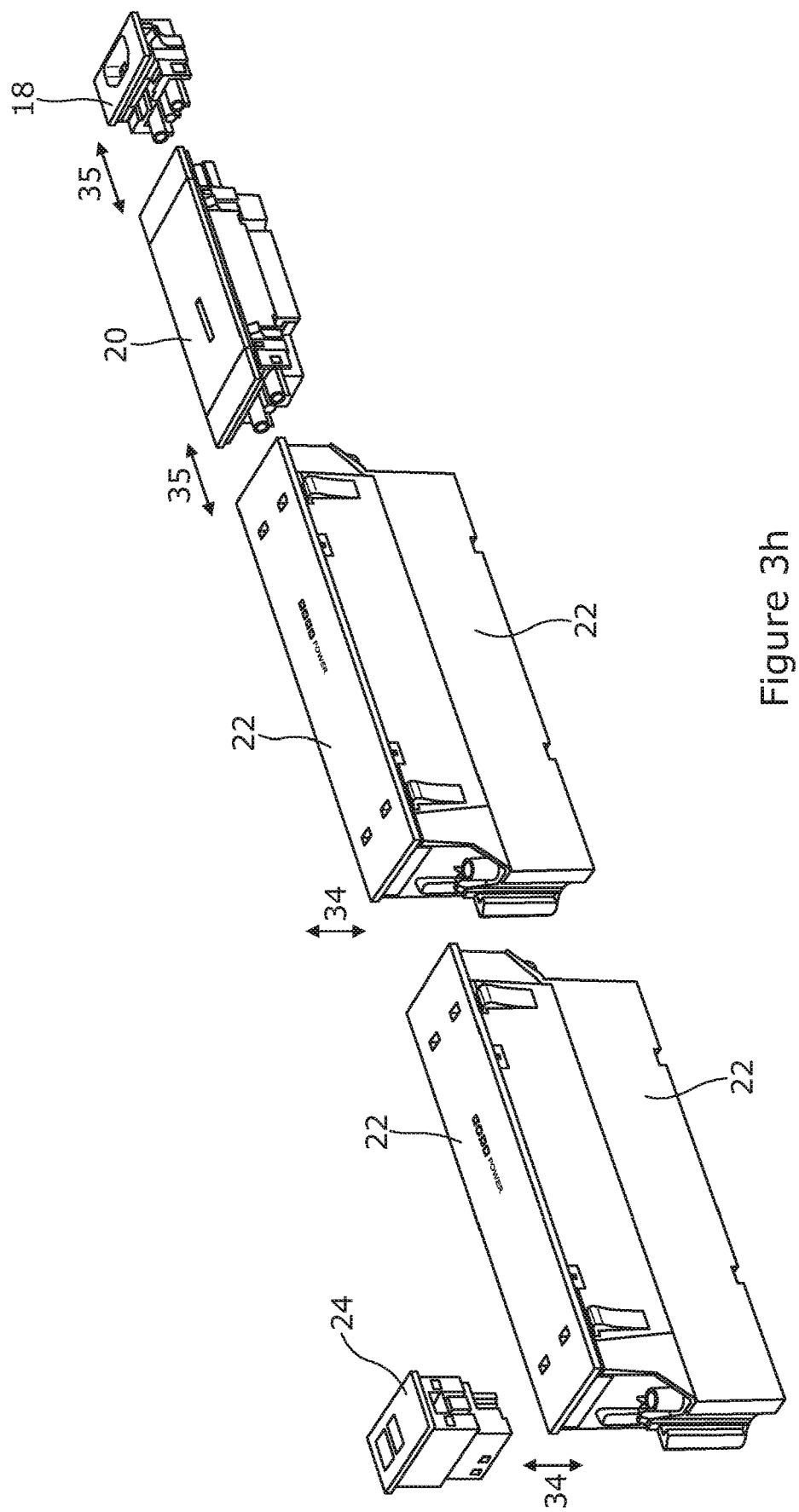
Figure 3I:
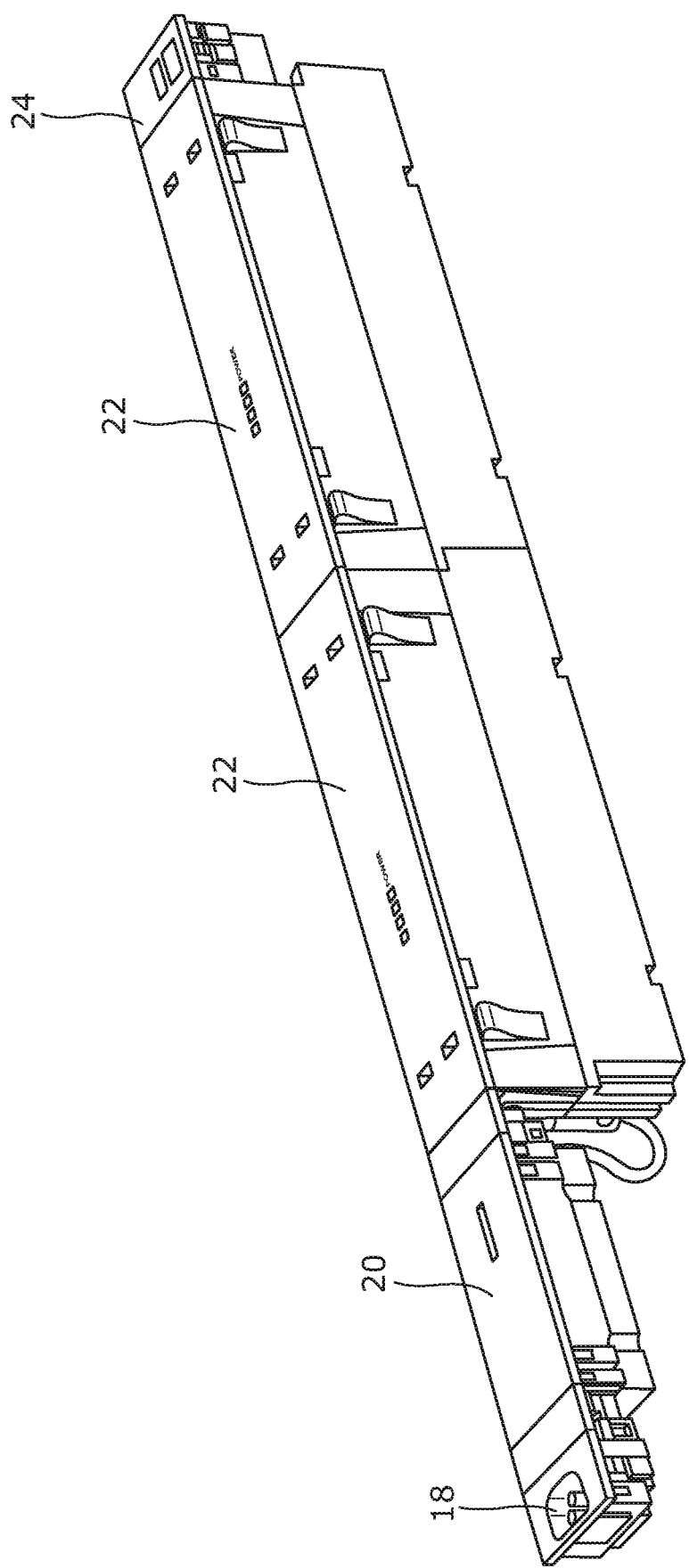
Figure 3J:
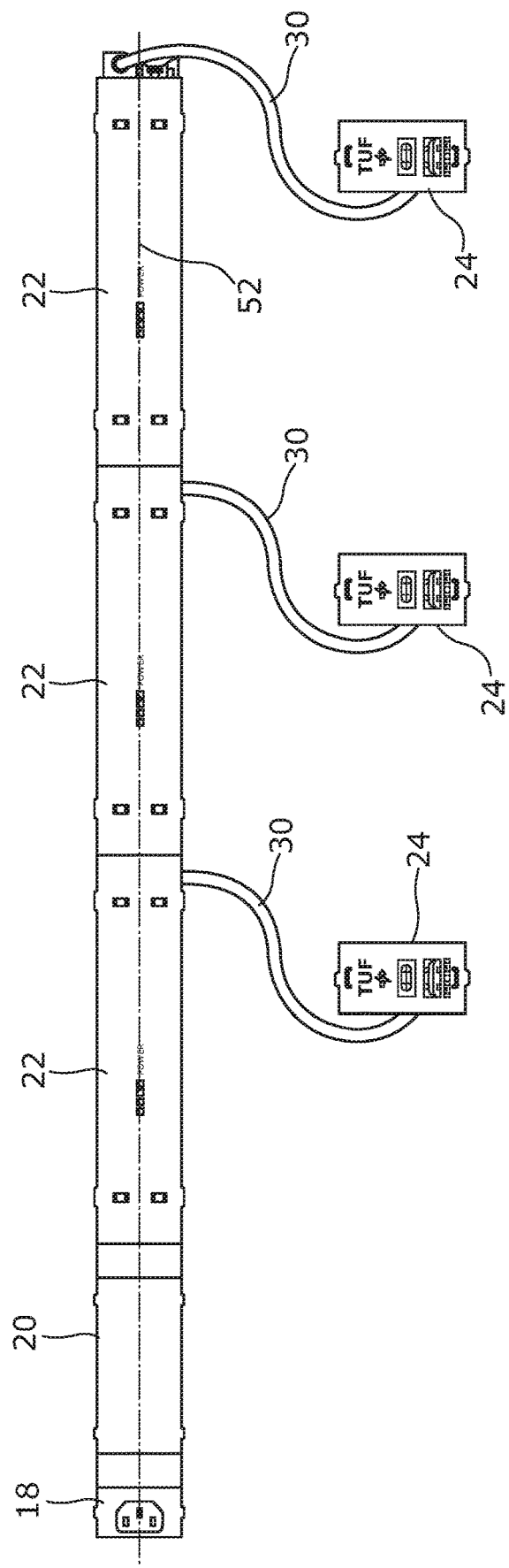
Figure 3K:
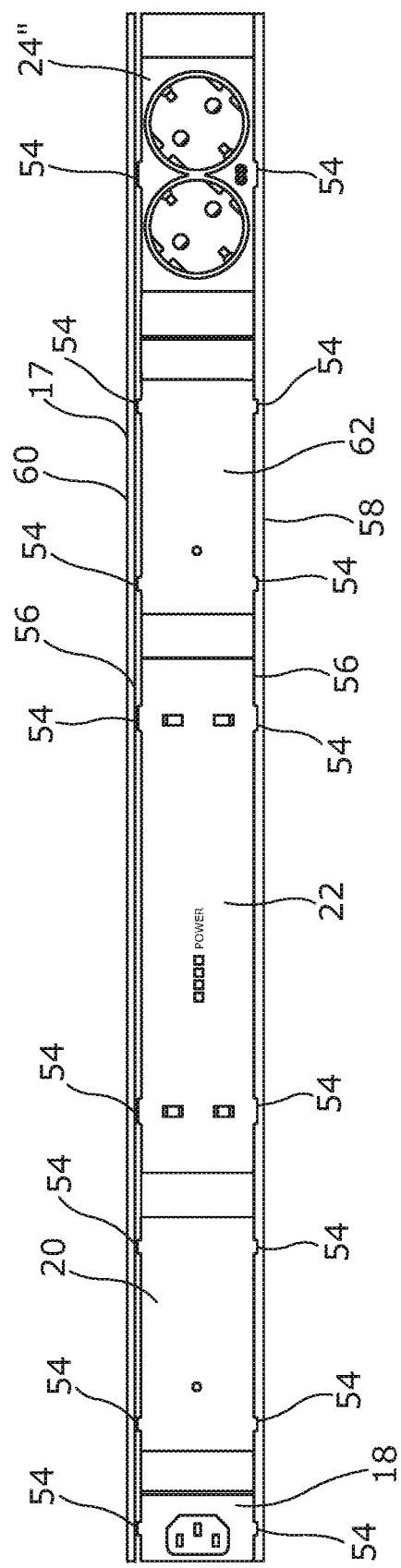

In FIGS. 2a, 2b, 2c, 3k and there is illustrated a configuration of selected modules located in the mounting means 17 and which include a mains power in-feed module 18 connected to a power supply unit module 20 to allow a mains power supply 28 when connected to the in-feed module 18, to be transformed via the power supply unit module 20 to a DC power supply format suitable to charge the cells of a connected battery module 22 in FIG. 3k or two battery modules 22 as provided in FIGS. 2b, 2c and 4a. When charged, the mains power supply can be disconnected and the battery module or modules 22 provide a power supply to one or more power provision point modules 24 which, as shown in FIGS. 4a, 3k and 2c, are electrically connected in a plug and play mode and mechanically connected in the mounting means 17 and, in FIG. 2b, are electrically connected via cable connections 30 and can be mechanically located to the item elsewhere. The power provision point modules 24 include at least one power connection means such as a DC USB socket 50 and/or a wireless charging facility which are connectable to allow power to be provided therefrom to operate apparatus. As a result of the provision of the power supply from the charged battery modules 22 there is no need for a continuous connection to the mains power supply and so the use and location and movement of the item of furniture can be independent of the location of the mains power supply. In these embodiments, when the modules are required to be charged, the item of furniture could, for example, be moved via the wheels 19 to a location to allow the same to be connected to the mains power supply, a cable and plug can be extended to the location of the item of furniture to provide the charging power to the power supply in-feed module 18.

With regard to FIG. 2b the item is a power hub is provided with a base 23, column 25 and work surface 27 which is provided with a power provision point module 24 thereon with one or more sockets and/or wireless charging facilities. In this embodiment the power provision point module 24 is connected to the remainder of the apparatus in the mounting means 17 via a cable connection 30 which passes along the interior of the column 25 to the mounting means 17. In this embodiment the mounting means 17 has mounted therein and provided in electrical and mechanical connection a battery module 22 and the mounting means 17 has space for the location of more battery modules if required and which, if mounted therein are electrically connected in series to allow an increased power and/or time of power, provision to be achieved.

Referring now to FIGS. 3a-k, there are illustrated a plurality of embodiments of possible configurations of apparatus in accordance with the invention. It will be noticed that in each case, there is provided a power supply unit module 20 and in FIGS. 3f and 3e there are provided a plurality of said modules 20. These modules 20 can be selectively connected to a mains power supply 28 via a power in-feed module 18 when it is required that charge is provided to battery modules 22 in situ in the mounting means as shown in FIGS. 3b, 3c, 3d, 3e, 3j, 3k. When more than one battery module 22 is provided, one or more power supply unit modules 20 may be provided and typically in each embodiment the respective modules are mechanically located end to end along the longitudinal axes 52 are electrically connected using plug and socket electrical connection means with a first end of each module having a plug connector and the opposing end having a socket connecter. The mechanical location of the modules with the mounting means 17 as shown, for example, in FIG. 3k, is via engagement of mechanical location clips 54 on each module with rails 56 running along the length of the opposing walls 58, 60 of the mounting means 17. Also provided are power provision point modules 24 in which sockets are provided and/or wireless charging facilities are provided to the required configuration. These modules 24 can be connected to the battery modules 22 using plug and socket connections, when the same are to be mechanically located in the same mounting means 17 and/or may be connected via cable connections 30 in order to allow a greater degree of flexibility as to their location of use. Also illustrated in FIGS. 3a and f is the fact that there may be provided power provision point modules 24 in direct connection with the power supply unit module 20 and hence allowing the provision of a power supply through these modules even when the battery pack modules 22 may not be present and/or are discharged.

In FIGS. 3g-i there is illustrated the same embodiment of the apparatus with, in FIGS. 3g and 3h, the components shown separated and in this case the component modules comprise first and second battery modules 22, a power provision point module 24, a power supply unit module 20 and a power supply in-feed module 18. FIG. 3i illustrates the modules of FIGS. 3g and h in a mechanically and electrically connected format which is achieved by relative movement together of the modules as indicated by arrows 34 and 35 to connect respective plug and sockets so as to achieve electrical connection and the mechanical location means 54 of the modules which are typically the same for each module allow engagement of the required modules with the mechanical location means 56 of the mounting means 17 so as to form an integral power supply unit with the required configuration for the particular use, as shown. The manner of the electrical and mechanical connection, and disconnection, being achieved, is described in greater detail with respect to FIGS. 4a and b subsequently.

In FIG. 3k the provision of an inverter module 62 is illustrated after the battery module 22 and which allows the DC power output from the battery module to be converted to an AC power supply output and provided to the power provision point module 24" which includes to sockets for the provision of AC power supply therefrom.

It will therefore be appreciated that the range of possible configurations which can be achieved using this invention to provide the apparatus in a required format for a particular use, is large and can be selected at various stages of the manufacturing and/or assembly process. FIG. 7 illustrates a kit of modules in accordance with one embodiment of the invention which comprise the AC power supply cable and plug 28, an AC power provision point module 24", power in-feed modules 18, power supply unit modules 20, battery modules 22, inverter modules 62, power provision point modules 24, mounting means 17 for the receipt of selected modules therein and cable connections 30 to allow modules to be electrically connected. It will be appreciated that the modules in this kit can be selected and then used in combination as appropriate at the time of assembly to form apparatus in accordance with a particular required configuration.

FIGS. 8a-d illustrate a power provision point module 24 in one embodiment and the same includes a body 64, and sockets 66 to allow the receipt of a plug connected to a device which is to be provided with power therefrom for operation and/or charging. The body also includes mechanical connection clips 54 which are biased towards the extended position shown such that the upper face 68 engage with the location means rails 56 of the mounting means 17 and can be biased inwardly by the use of a tool to allow the disengagement of the mechanical location clips 41 from the rails 56.

FIGS. 9a-d illustrate the battery module 22 in further detail and the same includes a body 70 in which the power cells of the battery are located. At one end 72 of the body there is provided an electrical connection socket 74 and at the opposing end 76 there is provided an electrical connection plug 78 and the same configuration is repeated for other modules so as to allow the electrical connection of the adjacent modules to be achieved. The body also includes mechanical location means 54 which in this embodiment are the same as the locking clip 41 and which are biased outwardly so as to engage with the rails 56 of the mounting means 17 as illustrated in broken lines in FIG. 9d until the same are released by use of the tool 45 as shown in FIGS. 6a and b which moves the locking means inwardly as indicated by arrows 80, 82.

FIG. 4a illustrates one embodiment of the apparatus similar to, but adapted from, that shown in FIG. 3g-i and shows the mains power supply being connected to a power in-feed module 18, which receives a cable and plug 28 to allow the mains power supply to be provided when it is desired that a charge is provided, via the power supply unit module 20, to the power cells contained in the battery modules 22 via the plug and socket connections between the respective modules.

Alternatively, the battery modules 22 may be removed from the mounting means 17 when a charge of the power cells is required and the modules 22 are taken to a remote charging location and charged and then returned as indicated by arrows 34 into position. In this arrangement the power in-feed module 18 and power supply unit 20 and plug and cable 28 need not be provided or, in another embodiment, the same can still be provided so as to allow two charging options to be available. It is envisaged that the battery modules 22 can be provided in direct plug and socket connection with the power provision point modules 24 which are provided, in this embodiment, with a wireless charging facility 26, or alternatively, can be connected via a cable connection as illustrated with the power provision point module 24' which is provided, in this embodiment, with sockets 26' so that for example, the power supply unit, battery and power provision point modules 20, 22 and 24 may be located at a first location on an item in the mounting means 17 and the power facility module 24' may be spaced from the same and provided at the most convenient location for use by the user. The particular form of the power provision point modules 24 provided with the apparatus can be selected to suit particular uses and, if required the power supply format can be changed back to an AC format by the provision of the inverter module 62 after the battery modules 22 so as to allow the power supply at the power provision point module to be in the appropriate format for apparatus which is to be connected thereto, such as a television, monitor or the like.

Referring now to FIG. 4b there is provided apparatus in a further but similar configuration to that of FIG. 4a in which there is provided a mounting means 17 in which there are provided first and second battery modules 22, a power supply unit module 20 and a power provision point module 24. In this embodiment the battery modules 22 can be selectively engaged with the mounting means 17 by the use of locking means clips 41 on the battery module or on a cover masking the battery module 22, which engage with the mounting means 17 as shown and are biased into the engaging position. The modules 20,24, as the same do not have to be removable as frequently as the battery modules, can be engaged in the same way or can be slid into position from the ends 31,33 of the mounting means 17 respectively into position and, as shown, a power in-feed module 18 can be selectively slid into position from end 31 as indicated by arrow 35 to electrically engage with the power supply unit module 20 via plug 37 into socket 39 so as to allow charging of the battery modules 22 in situ if required.

However if it is desired to remove the battery modules 22 for charging at a remote charging facility, the clips 41 can be retracted from an engaging position to allow the battery module 22 to be disengaged from the mounting means 17. In one embodiment the disengagement of the clips 41 can only be achieved by the specialised tool 45 such as that already referred to in FIGS. 6*a* and *b* which, for example, has pegs to fit into apertures 43 in the battery module 22, or in a cover which masks the battery module 22, in order to release the battery module 22 and remove the same from the mounting means 17. The battery module 22, in one embodiment can include a carry handle 45 to allow the battery module to be removed and taken to the charging facility for charging. The same procedure can be used in reverse to allow a charged battery module to be placed into the mounting means 17 and typically the electrical connection and disconnection of the electrical connection means 47 between the battery module 22 from other battery modules and/or other modules 20, 24 in the mounting means 17 occurs automatically when the mechanical connection or release of the battery module 22 from the mounting means 17 is performed.

FIGS. 5*a-e* illustrate embodiments of a form of the apparatus and shows a battery module 22 connected to a power provision point module 24 in the form of a USB charging module via plug and socket connections between the respective modules, the combined module assembly then being located in a mounting means 17 in an item of furniture such as a desk or table 8 and removable for storage and/or battery charging by disengagement of clips using a specialised tool as described for FIGS. 6*a* and *b* and 4*a*.

Figure 5A:
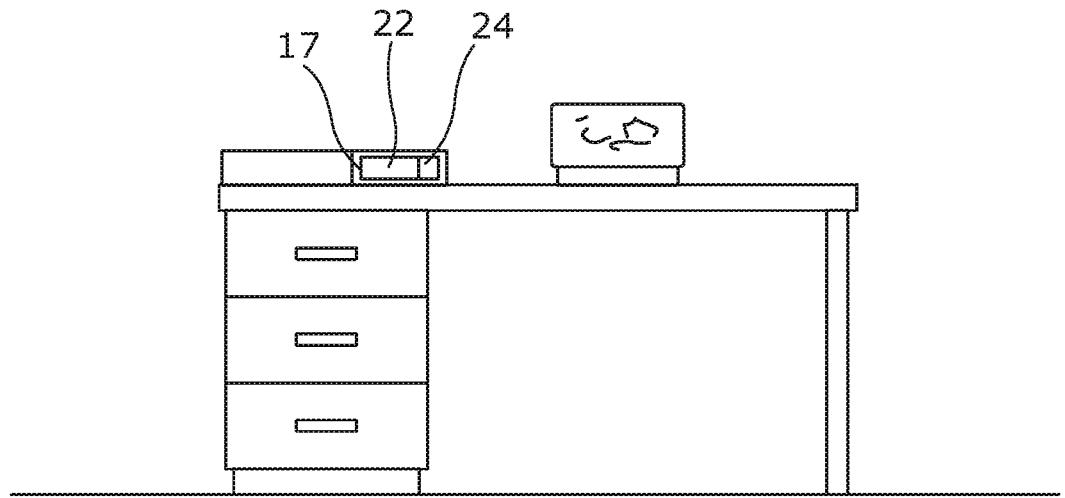
Figure 5B:
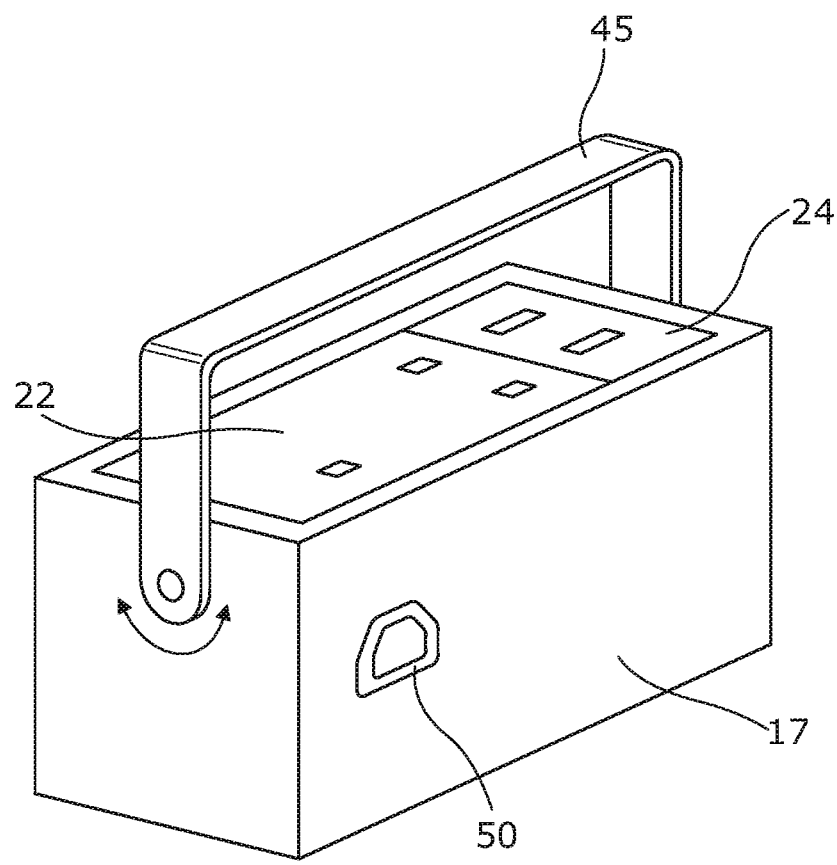
Figure 5D:
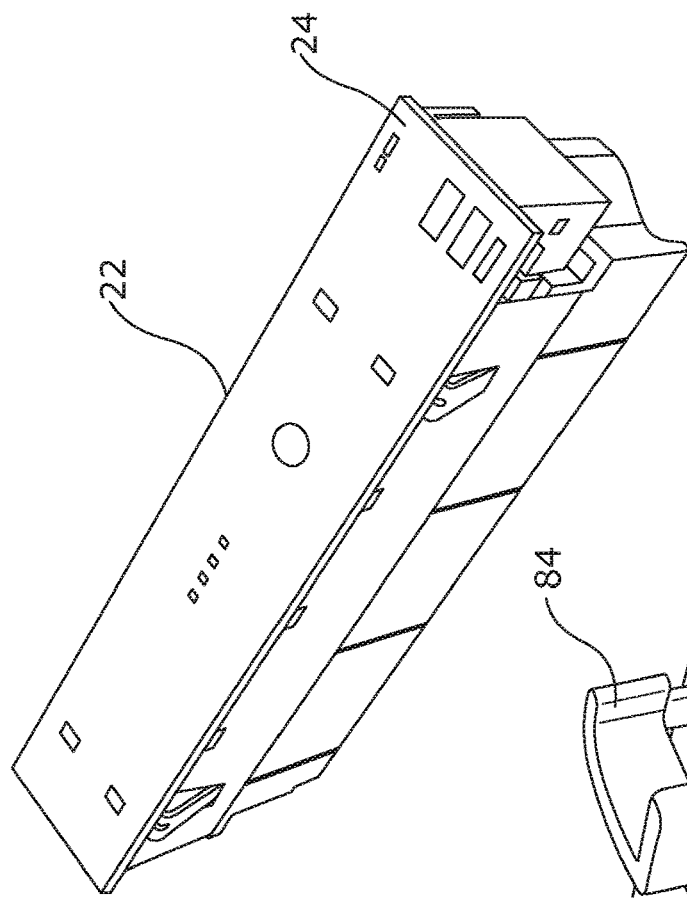
Figure 5E:
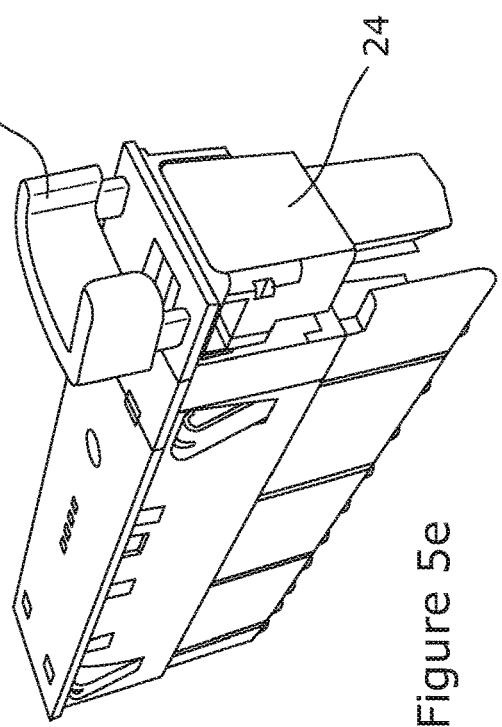
Figure 5C:
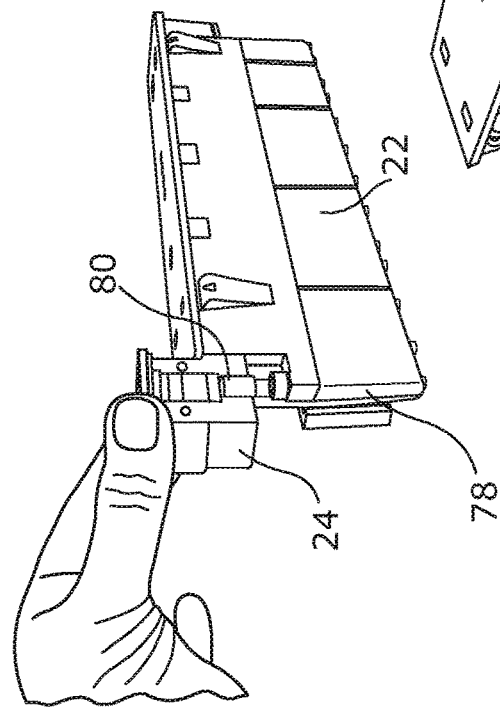

FIG. 5*b* and FIGS. 5*c-e* illustrate embodiments of the apparatus and shows a battery module 22 connected to a USB charging module 24 via a plug connection 78 on the battery module 22 and socket connection 80 on the module 24. In FIG. 5*b* the combined module assembly is located in a portable mounting means 17 which may have a carry handle 45 and a DC power in connector 50 at a suitable location on the mounting means so as to allow the battery module 22 to be selectively connected to the DC power connection in order to allow the same to be charged without the need for removal of the battery module from the portable mounting means 17. The configuration shown in FIGS. 5*a-e* therefore allows the battery module 22 and power provision point module 24 to be combined and used as a portable device which can be selectively located with the mounting means 17 or used separately therefrom. The power provision point module 24 may be removable using a tool 84 as illustrated.

The invention as herein described therefore provides an independent, fully modular and reconfigurable, remote, power supply facility which allows greater flexibility in the usage of space in which the apparatus in accordance with the invention is provided.

The invention claimed is:

1. A modular power supply apparatus, said apparatus including:
   at least one battery module with one or more power cells provided therein,
   a plurality of power provision point modules electrically connected to receive power from said battery module to provide DC or AC power,
   a power supply unit module to allow the change of power supplied to the apparatus from AC to DC power,
   and/or a power infeed module,
   and a mounting means,
   wherein said modules are selectively directly or indirectly electrically connected to said at least one battery module to provide a selected configuration of the apparatus and wherein
   at least the said at least one battery module and at least one of, the power provision point modules, power supply unit module and/or power infeed module include mechanical location means of substantially a same form so as to allow said modules to be mechanically located with said mounting means in an in-line configuration and electrically connected via respective plug and socket connectors and said mounting means selectively located with an item of furniture for use therewith.

2. Apparatus according to claim 1 wherein the battery module includes a body with at least one rechargeable power cell located therein.

3. Apparatus according to claim 1 wherein each battery module has an input and an output power connector and said mechanical location means align respective battery modules mechanically located in the mounting means in line and allow electrical connection of the respective input and output of adjacent battery modules.

4. Apparatus according to claim 1 wherein the said electrical connection means are provided in the form of an input plug or socket at one end of the module and an output in the form of the other of a plug or socket at the opposing end of the module.

5. Apparatus according to claim 1 wherein the battery module is disconnectable from the mounting means to allow the same to be moved to be connected to a power source for recharging the power cells therein.

6. Apparatus according to claim 5 wherein the power source is a charging bank for a number of battery modules.

7. Apparatus according to claim 1 wherein the battery module includes a handle to allow the battery module to be carried between the charging facility and the mounting means.

8. Apparatus according to claim 1 wherein a power in-feed is provided to the apparatus for the provision of AC or DC power to allow the charging of said at least one battery module.

9. Apparatus according to claim 8 wherein a power in-feed module is provided in the mounting means to allow an AC power supply to be connected therewith and the power in-feed module is electrically connected to the power supply unit module which converts the AC power to a DC power supply which is provided via electrical connection to the battery module electrically located thereto to allow in situ charging of the battery module to occur.

10. Apparatus according to claim 8 wherein a plurality of battery modules are electrically connected in series and mechanically located in line in the mounting means and are charged together.

11. Apparatus according to claim 8 wherein the power supply is provided to the apparatus via a detachable cable and plug connection.

12. Apparatus according to claim 1 wherein the apparatus includes a plurality of power provision point modules which are selectively connectable to one or more of said battery modules and/or one or more power supply unit modules and/or a power in-feed module so as to allow power for operation of charging of electrical devices to be made available therefrom.

13. Apparatus according to claim 12 wherein said power provision point modules are electrically connected to the other modules by via plug and socket connection or cable connection so as to allow the power provision points to be located at an appropriate position for use.

14. Apparatus according to claim 13 wherein the power provision points and mounting means and modules located thereon are provided in location on the same item.

15. Apparatus according to claim 14 wherein the mounting means mechanically locates a selected number of battery modules therewith and which are electrically connected in line so as to define the DC power capacity and/or length of time of provision of DC power therefrom.

16. Apparatus according to claim 1 wherein the mounting means has mechanically located therewith at least a power infeed module, a power supply unit module, and one or more battery modules and said modules are located in line and electrically connected in series.

17. Apparatus according to claim 1 wherein only the mounting means is required to be mechanically locatable with said item and the located mounting means allows modules to be located therewith, within the said item.

18. Apparatus according to claim 1 wherein a selected number of said power provision point modules are provided in a selected configuration to allow a selected number and/or types of power provision point modules to be available.

19. Apparatus according to claim 1 wherein at least one DC to AC inverter module is connected to a battery module output to provide AC power to a power provision point module.

20. Apparatus according to claim 1 wherein the said mounting means includes mechanical location means in the form of one or more tracks with which the said modules can be selectively mechanically located.

21. Apparatus according to claim 1 wherein one or more of the power provision point modules include a USB charging socket.

22. Apparatus according to claim 21 wherein the said USB socket power provision point module can be mechanically and electrically connected to a battery module.

23. Apparatus according to claim 22 wherein the said battery module is removable from the mounting means and such that the battery module and power provision point module located thereon can be used at a location independently from the mounting means.

24. Apparatus according to claim 1 wherein the selection of the modules and connection of the same with each other and the mounting means is performed at the time of assembly of the apparatus and with respect to the required configuration of the apparatus.

25. An item of furniture, said item of furniture including at least one power provision point module for the provision of power for selective use by a device, wherein the said at least one power provision point module is electrically connected to one or more battery modules from which said power is provided and said one or more battery modules are located in a mounting means in which the said at least one power provision point module is also mechanically connected using substantially similar mechanical location means to those of the one or more battery module and said modules are mechanically located in line in said mounting means and electrically connected when mechanically located in said mounting means via a respective plug and socket connection and each said power provision point module which is selected to be used for a required configuration provides AC or DC power therefrom and the mounting means is in turn mechanically located in the said item of furniture so as to form a power supply source for the item of furniture.

26. An item according to claim 25 wherein said mounting means is mechanically located with the said item of furniture in a position which is constant despite the selected configuration of modules from a range of possible module configurations.

27. A kit of parts for the provision of a power supply apparatus, said kit including a mounting means with mechanical location means formed therein, a plurality of modules, each having substantially similar mechanical location means, to allow selective location of the said modules within the mounting means so as to provide the apparatus in a predetermined configuration for use within an item of furniture, to provide one or more power provision points thereon and wherein said modules include; at least one battery module with power cells which are rechargeable and from which DC power is supplied, one or more power provision point modules which allow power to be provided from the same to operate/charge a device and at least one power supply unit module which allows the conversion of an AC power supply to a DC power supply to charge the said battery module and wherein said modules which are selected and mechanically located with the mounting means in-line, include at least one battery module and one or more power provision point modules each of said power provision point modules selected to provide AC or DC power therefrom and electrical connection of said selected modules located in the mounting means is achieved via engagement of respective plugs and socket connectors provided on said modules.

28. Apparatus according to claim 1 wherein the selection of the combination of at least one battery module and at least one of, power provision point modules, power supply unit module and/or power infeed module and fitment of the same in the said mounting means using mechanical location means common to an existing AC power supply apparatus, enables the adaptation of the said existing AC power supply apparatus to provide DC or DC and AC power therefrom.

29. Apparatus according to claim 28 wherein the adaptation is performed whilst continuing to use the existing mounting means of the said existing AC power supply apparatus.

30. Apparatus according to claim 28 wherein the adaptation includes the change of the power supply at the apparatus from incoming AC to DC.

31. Apparatus according to claim 28 wherein the adaptation includes a conversion back to at least one AC power provision point module by including an inverter module to allow new and/or existing AC power provision point modules to provide AC power therefrom.

\* \* \* \* \*